Jan. 3, 1939.   A. N. TAYLOR   2,142,384
MOTOR VEHICLE HEADLIGHT
Original Filed May 16, 1932    3 Sheets-Sheet 3
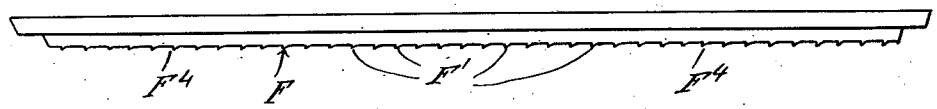
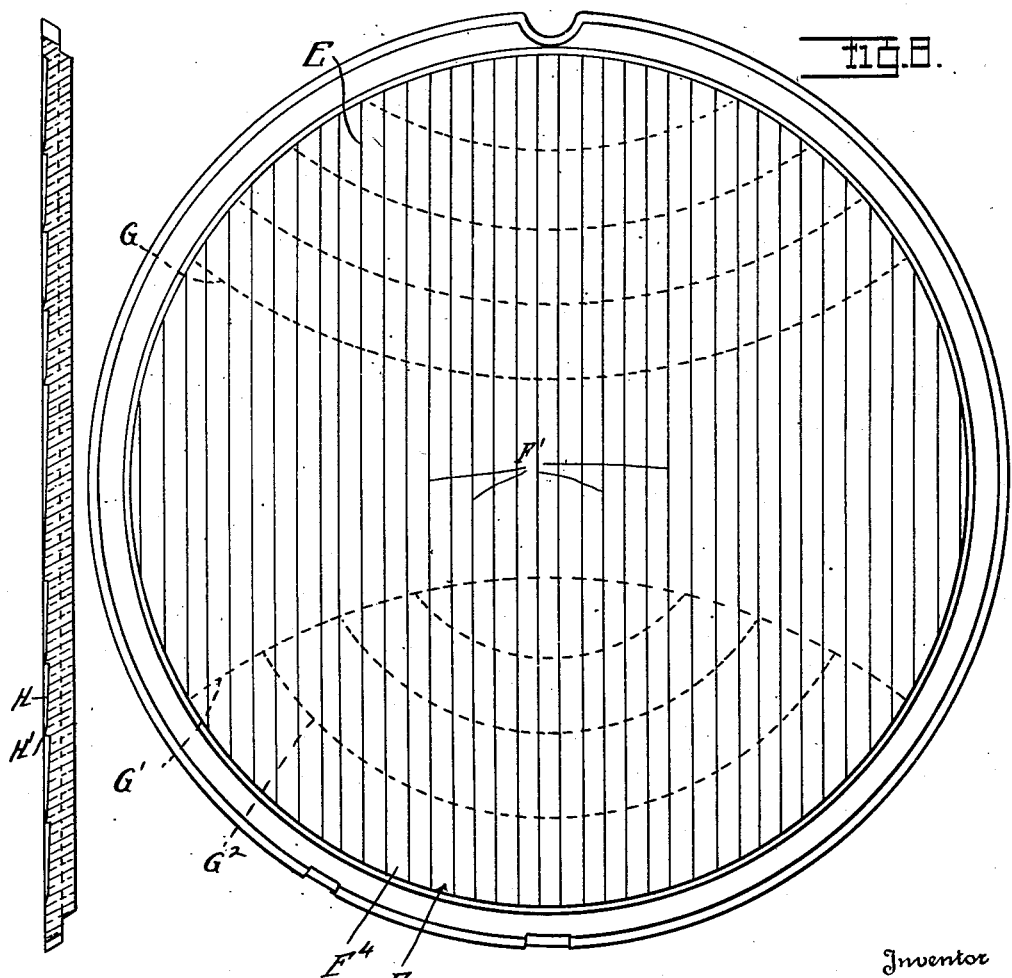
Inventor
Arnold N. Taylor Patented Jan. 3, 1939

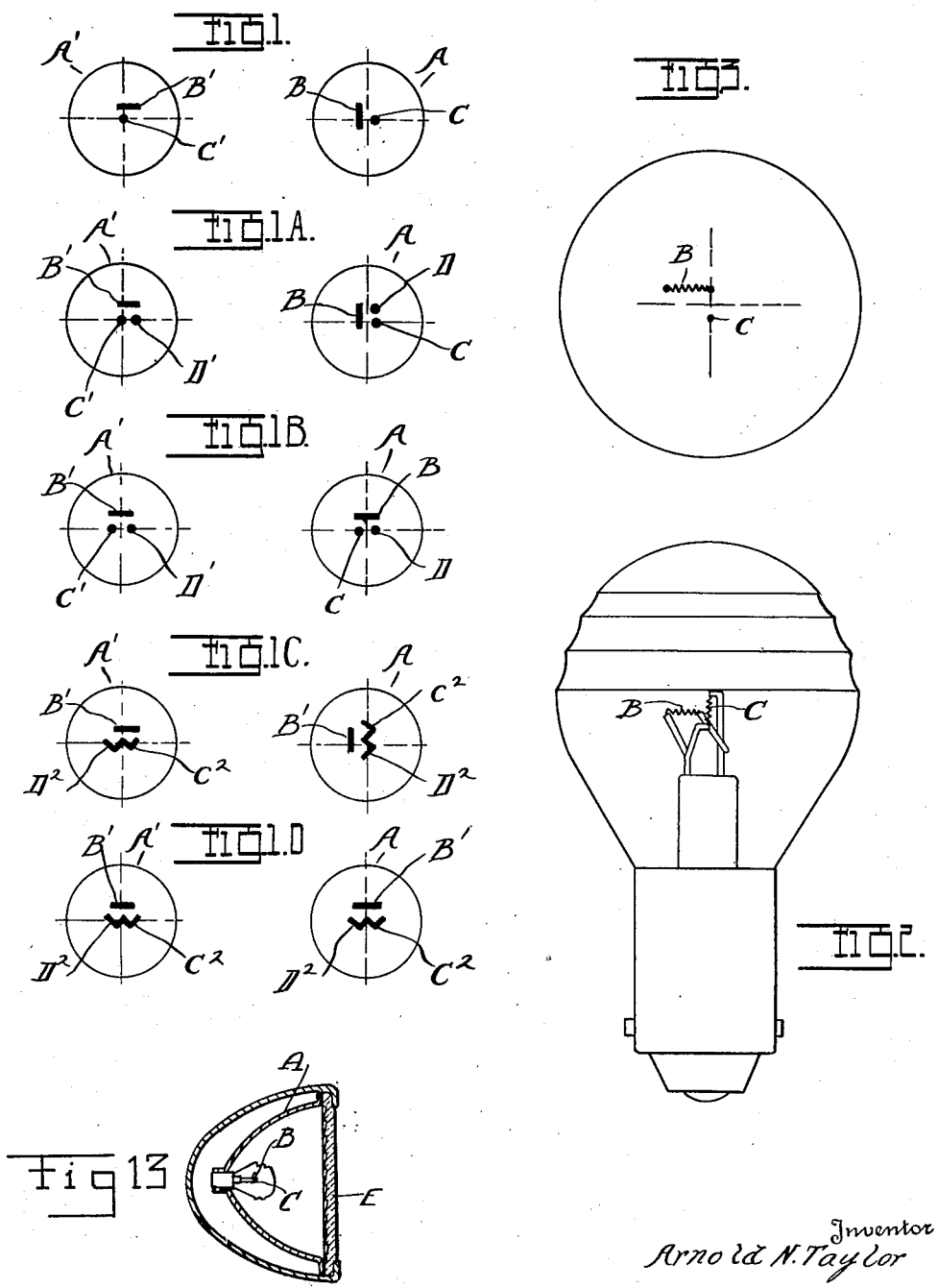

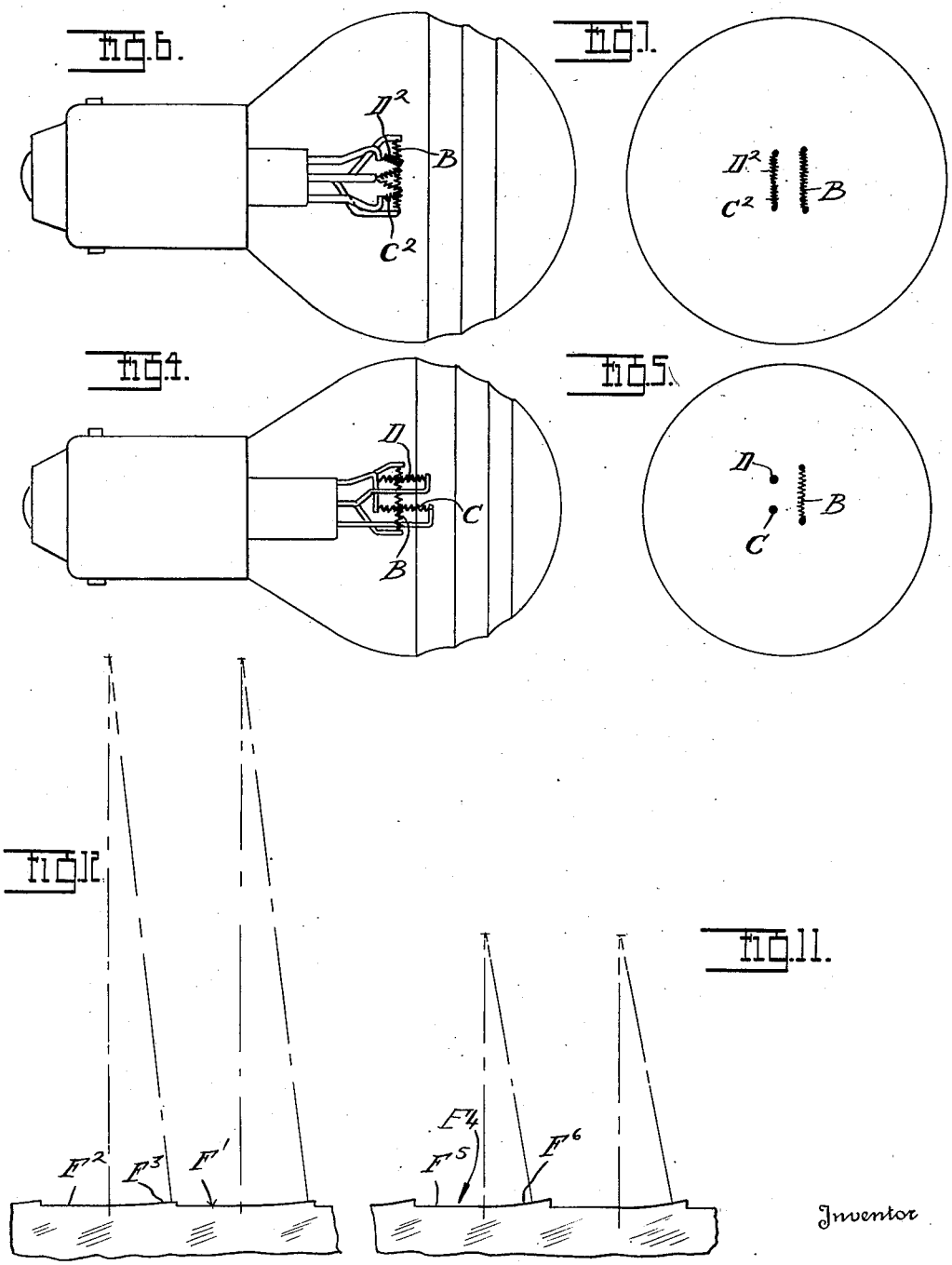

2,142,384

UNITED STATES PATENT OFFICE 2,142,384

MOTOR VEHICLE HEADLIGHT

Arnold N. Taylor, Detroit, Mich., assignor to C. M. Hall Lamp Company, Detroit, Mich., a corporation of Michigan Application May 16, 1932, Serial No. 611,679
Renewed April 2, 1936

2 Claims. (Cl. 240—41.4)

The invention relates to motor vehicle head lights and has for its object the obtaining of a construction which will afford better illumination when passing other cars, while avoiding any detrimental glare. In the present state of the art it is quite usual to employ the so-called depressed beam for passing other cars. This, while lighting the road in the immediate foreground, is so limited in range as to necessitate the slowing of the car to avoid possible danger ahead. On the other hand the raised beam normally used produces an objectionable glare in the eyes of the passing driver. To overcome this difficulty it is the object of the present invention to obtain a construction of head light for passing other cars which in addition to illuminating the immediate foreground will have a beam directed to a point further in advance but confined to the right hand side of the road. It is also an object to produce an uninterrupted path of light on the right hand side of the road from the point farthest in advance back to the immediate foreground and to so grade the intensity of the light as to partially compensate for losses due to increasing distance. Still further it is an object to obtain a superbeam which can be used when desired to give exceptionally bright illumination. These objects are attained, first, by the novel construction and arrangement of the filaments in the lamp bulb; second, by the arrangement of the bulbs in the head lights of the vehicle; third, in the combination with the lamp bulb and reflector of a novel construction of lens as hereinafter set forth.

In the drawings:

Figure 1 is a diagram illustrating the relation of the lamp filaments to the axes of the reflectors in the right hand and left hand head lights;

Figures 1A, 1B, 1C and 1D are similar views showing modified constructions;

Figure 2 is an elevation of one of the lamp bulbs of Fig. 1 showing the arrangement of the filaments therein;

Figure 3 is a plan view thereof;

Figure 4 is a view similar to Figure 2 showing a modified construction corresponding to Figs. 1A and 1B;

Figure 5 is a plan view thereof;

Figure 6 is a view similar to Figure 2 showing another modification corresponding to Figs. 1C and 1D;

Figure 7 is a plan view thereof;

Figure 8 is an elevation of the lens used for the right hand head light;

Figure 9 is a vertical section therethrough;

Figure 10 is a horizontal cross section, and

Figures 11 and 12 are enlarged views illustrating the construction of flutes in the lens of the right hand lamps.

Figure 13 is a vertical section through one of the head lights.

In the present state of the art the two filament bulb which is generally used for raised and depressed beam illumination has the filaments so arranged that when properly focused in relation to a parabolic or similar reflector one of said filaments is above the central axis of the reflector and the other substantially at the axis. Thus the latter will give the straight ahead or raised beam, while the raised filament will through the reversal of the reflector give the depressed beam. It is also usual to employ the same arrangement of bulb in each of the two head lights. With my improved construction I equip one of the head lights, preferably the right hand light A with a two filament bulb, one of the filaments B being arranged to the left of the central axis of the reflector and extending in a vertical plane above the horizontal plane of the axis. The other filament C is arranged to be symmetrical with respect to the horizontal plane of the axis or substantially equal in extent on opposite sides of said plane. Thus the first of these filaments will produce a beam deflected to the right of the center of the road while the second filament will produce the substantially straight ahead beam. The other or left hand head light A' may be equipped in the usual manner with one filament B' above the horizontal plane and the other filament C' substantially in said plane.

With the arrangement just described, the filaments C and C' can be used for normal driving and the filaments B and B' for passing other cars. The filament B' produces a depressed beam which illuminates the immediate foreground and the filament B produces a right laterally deflected beam which extends to a point as far in advance as would be reached by the normal driving beam but does not bother the oncoming driver on the left hand side of the road. Inasmuch, however, as the greater portion of the filament B is above the horizontal axis the light therefrom will extend downward as well as straight ahead so as to produce a path of light extending along the right hand side of the road from the distant point rearward towards the car.

It is usual to employ lenses which spread the beam to cover a larger area and by diffusion to reduce the intensity. These lenses are so constructed as to distribute the light to form a predetermined pattern and are usually the same in both of the head lights of the vehicle. With my improved construction I use a special lens for one of the head lights preferably the right hand light or the one having the bulb with the filaments B and C. This lens is so constructed that the greater portion of light rays are permitted to pass therethrough without material refraction so as to give the concentration, while another portion is diffused differentially towards the right all being bent slightly in a downward direction. The effect of this lens in combination with the filament B is to diffuse the beam at the right of the road towards the right with diminishing intensity and also from the top downward with a diminishing intensity. This still leaves a highly concentrated portion which is directed to a distant point at the right hand side of the road and which by its intensity compensates for diminution due to distance. On the other hand the head light A' on the left is provided with a lens of the usual construction but differentially diffuses the light laterally both to the right and left and also in a downward direction. The effect of this lens on the filament B' is to spread the light in the immediate foreground to both sides of the road and to depress the beam sufficiently to avoid interference with the oncoming driver. Thus the total effect of the two head lights when using only the filaments B and B' is to produce a substantially L-shaped pattern of light that illuminates the immediate foreground over the entire width of the road and from there extends forward on the right hand side only of the road to a distant point.

To avoid complexity I preferably use lamp bulbs which are the same in construction for both the right hand and left hand lamps of the car, differing only in the manner in which they are positioned in said lamps. However, to produce the best effect I have designed a special form of bulb in which the filament B is extended in a straight line perpendicular to the plane of the longitudinal axis of the bulb and laterally off-set from said axis. The other filament C may be variously positioned as illustrated in the different modifications and a third filament may also be used for a super-lighting effect. Thus as shown in Figures 2 and 3, the filament C is arranged parallel to the longitudinal axis of the bulb and off-set from said axis on the opposite side thereof from the filaments B which as shown in the said figures is also a straight line filament extending perpendicular to the longitudinal axis of the bulb.

With the modified construction shown in Figures 4 and 5 the filaments B and C are arranged the same as in Figures 2 and 3 and a third filament D is arranged parallel to the filament C on the opposite side of the longitudinal axis. With the constructions shown in Figures 6 and 7 the filament B remains in the same position but in place of the straight line filaments C and D there are the V-shaped filaments $C^2$ and $D^2$ arranged in a plane parallel to the longitudinal axis of the bulb and also parallel to the filament B.

The arrangement of these various constructions of bulbs in the head lights and in relation to the axes of the parabolic or other similar reflectors thereof is illustrated in the diagrams, Figures 1—A, 1—B, 1—C and 1—D. As shown in Figure 1, the bulb used is that illustrated in Figures 2 and 3 and as will be noted the left hand headlight has the filament B' extending in a horizontal plane above the horizontal axis of the reflector and the filament C' substantially at the axis. On the other hand in the right hand head light the filament B is arranged in a vertical plane to the left of the vertical axis of the reflector and chiefly above the horizontal axis thereof while the filament C is arranged to the right of the vertical axis and substantially in the horizontal axis. Figure 1—A illustrates the arrangement of the bulbs shown in Figures 4 and 5 and the arrangement of the filaments B and C is the same as in Figure 1. The additional filament D' in the left hand head light is substantially at the horizontal axis and to the right of the vertical axis of the reflector and in the right hand head light the filament D is above the horizontal axis and to the right of the vertical axis. In Figure 1—B the arrangement of the filaments in the left hand head light is the same as in Figure 1—A, with the exception that there is a shifting with respect to the focus of the reflector so as to have a symmetrical arrangement on opposite sides of said focus. The arrangement in the right hand head light is the same as that in the left. In Figure 1—C the construction of bulb is that shown in Figures 6 and 7 having the filaments B, $D^2$ and $C^2$, the arrangement being the same as shown in Figure 1—A. In Figure 1—D the bulbs are the same as in Figure 1—C but are arranged in the head lights the same as in Figure 1—B.

With the construction shown in Figures 1—A, 1—B, 1—C and 1—D there are three different beams which may be alternatively used in driving, viz: a driving beam, a passing beam and a tilt beam. In Figure 1—A the driving beam uses the filaments C' and D' in the left hand head light and the filament C in the right hand head light. The passing beam uses the filament B' in the left hand head light and the filament B in the right hand head light and the tilt beam uses the filament B' in the left hand head light and the filament D in the right hand head light. Inasmuch as the driving beam has the combined light of three filaments it is of high intensity and the differential refraction of the lens will diffuse portions of the light over the road with the highest concentration in that portion which is projected to the greatest distance. On the other hand with a passing light there will be the L-shaped pattern previously described which illuminates a path along the right hand side of the road to a considerable distance in advance and at the same time spreads the light across the entire road in the immediate foreground. With the third or tilt beam all of the light from two filaments is directed below the horizontal so as to illuminate the foreground but not to extend to any great distance. Similar effects are produced by the arrangement shown in the other figures but the preferable form is as shown in Figure 1—C which employs the preferable form of lamp bulb shown in Figures 6 and 7.

The construction of lens which is used in connection with the right hand head light is preferably as illustrated in Figures 8 to 12. This lens is provided on one side preferably the front, with a series of vertically extending flutes F for differentially refracting the light towards the right. These flutes are in several groups including a central group of the construction shown in the enlarged figure, Figure 12, and groups on opposite sides of this central group of the construction shown in Figure 11. The flutes F' of the central group have substantially one-half the area F² with a plain face perpendicular to the direction of the beam. The other half of the area F³ is a curve tangent to the portion F² and of relatively long radius. Thus with this flute only a small portion of the light is refracted towards the right. The outer groups have flutes F⁴ which also have a portion F⁵ substantially one-half the area perpendicular to the direction of the beam and a concave portion F⁶ which, however, is of a curve of smaller radius than the portion F³. This will produce a greater refraction of the light towards the right than with the construction shown in Figure 12. The lens E is also provided with prisms on the reverse side thereof which refract the light in a downward direction. These prisms define different zones as indicated by the curved lines G, G', G² but the angularity is comparatively slight, as for instance one or two degrees. However, to define the pattern produced by the lines G, G', G² which correspond to the pattern of the standard lens (not shown) for the left hand head light, each of the prisms H has a sharp angled bead H' at one edge. The total effect of the lens E is to differentially refract a portion of the light to the right while leaving the greater portion concentrated as directed by the reflector and also to produce a very slight downward refraction.

The construction as above described has many advantages among which are, first, the unique distribution of the light of the passing beam so as to afford adequate illumination of the road without annoyance to the passing driver; second, the super-lighting effect produced by the third filament and the combination of the same with the other filaments; third, simplicity in construction, a single construction of lamp bulb being used in each of the head lights but with differential lighting effects; fourth, that while a special lens is used for the right hand head light, the external appearance of both lights is the same, each having the same pattern.

While I have referred to the right hand head light as being of special construction, it is obvious that this special construction could be applied equally well to the left hand head light, if so desired. Also for use in countries for instance as England, where it is customary to drive to the left, the construction is modified so as to illuminate the left hand side of the road instead of the right hand side as previously described.

While I have specifically described a parabolic reflector, it is obvious that other forms than that of an exact paraboloid may be used for projecting the beam, and I have used the term "concave reflector" as generic to these various constructions, the essential feature of which is that the light rays from the bulb are concentrated and projected through a limited angle about a central axis.

What I claim as my invention is:

1. A headlight lens having a series of vertically extending flutes of different refracting power for differentially refracting the light towards one side only and having a plurality of transversely extending zones for refracting the light downwardly, said transversely extending zones comprising a central main zone bounded by oppositely curved transverse lines and an upper zone and a lower zone on opposite sides of said main zone, said upper zone being subdivided into a series of sub-zones of substantial width, each bounded by lines curving in the same direction and said lower zone being subdivided into a series of sub-zones bounded by a series of lines curving in the same direction, all being prisms inclined in the same direction and each having a sharp-angled bead at the lower margin thereof.

2. A headlight lens having a series of vertically extending flutes of different refracting power for differentially refracting the light towards one side only and having a plurality of transversely extending zones for refracting the light downwardly, said vertically extending flutes each having substantially one-half the area thereof perpendicular to the direction of the beam and the remainder of the area thereof being a curve tangent thereto, said vertically extending flutes comprising a central group in which said curve is of relatively long radius and outer groups in which said curve is of smaller radius, said transversely extending zones comprising a central main zone bounded by oppositely curved transverse lines and an upper zone and a lower zone on opposite sides of said main zone, said upper zone being subdivided into a series of sub-zones of substantial width, each bounded by lines curving in the same direction and said lower zone being subdivided into a series of sub-zones bounded by a series of lines curving in the same direction, said sub-zones being inclined slightly in the same direction to produce a slight downward refraction.

ARNOLD N. TAYLOR.